(12) United States Patent
Crinon et al.

(10) Patent No.: US 8,717,949 B2
(45) Date of Patent: *May 6, 2014

(54) ACTIVE SPEAKER IDENTIFICATION

(71) Applicant: Microsoft Corporation, Redmond, WA (US)

(72) Inventors: Regis J. Crinon, Camas, WA (US); Humayun Khan, Redmond, WA (US); Dalibor Kukoleca, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/746,740

(22) Filed: Jan. 22, 2013

(65) Prior Publication Data

US 2013/0138740 A1    May 30, 2013

Related U.S. Application Data

(63) Continuation of application No. 11/761,963, filed on Jun. 12, 2007, now Pat. No. 8,385,233.

(51) Int. Cl.
*H04L 12/16* (2006.01)

(52) U.S. Cl.
USPC ..................... 370/260; 379/202.01

(58) Field of Classification Search
USPC .................. 370/260, 261, 265, 267, 269; 379/202.1, 203.1, 205.1, 206.1, 207.1
See application file for complete search history.

(56) References Cited

U.S. PATENT DOCUMENTS

| 4,658,398 | A | 4/1987 | Hsing |
| 5,383,184 | A | 1/1995 | Champion |
| 6,453,022 | B1 | 9/2002 | Weinman, Jr. |
| 6,662,211 | B1 | 12/2003 | Weller |
| 6,728,221 | B1 | 4/2004 | Shaffer et al. |
| 6,728,358 | B2 | 4/2004 | Kwan |
| 6,888,935 | B1 | 5/2005 | Day |
| 6,894,715 | B2 | 5/2005 | Henrikson |
| 6,963,561 | B1 * | 11/2005 | Lahat ............................ 370/356 |
| 6,970,935 | B1 | 11/2005 | Maes |
| 7,006,616 | B1 | 2/2006 | Christofferson et al. |
| 8,385,233 | B2 | 2/2013 | Crinon et al. |

(Continued)

FOREIGN PATENT DOCUMENTS

| CN | 1871825 A | 11/2006 |
| EP | 1551205 A1 | 6/2005 |

(Continued)

OTHER PUBLICATIONS

Chinese 2nd Office Action in Application 2008800201592, mailed Mar. 2, 2012, 22 pgs.

(Continued)

*Primary Examiner* — Hassan Phillips
*Assistant Examiner* — Ajay Cattungal
(74) *Attorney, Agent, or Firm* — Sonia Cooper; Jim Ross; Micky Minhas

(57) ABSTRACT

Procedures for identifying clients in an audio event are described. In an example, a media server may order clients providing audio based on the input level. An identifier may be associated with the client for identifying the client providing input within the event. The ordered clients may be included in a list which may be inserted into a packet header carrying the audio content.

20 Claims, 4 Drawing Sheets

(56) References Cited

U.S. PATENT DOCUMENTS

| | | | |
|---|---|---|---|
| 2003/0004228 | A1 | 1/2003 | Laursen et al. |
| 2004/0057436 | A1* | 3/2004 | Couturier et al. ........ 370/395.21 |
| 2004/0076277 | A1* | 4/2004 | Kuusinen et al. ........ 379/202.01 |
| 2005/0025073 | A1* | 2/2005 | Kwan ......................... 370/260 |
| 2005/0135280 | A1 | 6/2005 | Lam |
| 2005/0180341 | A1 | 8/2005 | Nelson |
| 2006/0040685 | A1* | 2/2006 | Kwon ......................... 455/507 |
| 2006/0247045 | A1 | 11/2006 | Jeong et al. |
| 2007/0124377 | A1 | 5/2007 | Schmidt et al. |
| 2007/0165820 | A1* | 7/2007 | Krantz et al. ............ 379/202.01 |
| 2008/0159507 | A1* | 7/2008 | Virolainen et al. ...... 379/202.01 |
| 2008/0205390 | A1* | 8/2008 | Bangalore et al. ............ 370/389 |
| 2008/0260131 | A1* | 10/2008 | Akesson ................. 379/202.01 |
| 2009/0002480 | A1* | 1/2009 | Cutler ...................... 348/14.08 |

FOREIGN PATENT DOCUMENTS

| | | |
|---|---|---|
| JP | 2004-534457 | 11/2004 |
| JP | 2005-531999 | 10/2005 |
| WO | WO 03/003157 A2 | 1/2003 |
| WO | WO 2005/018192 | 2/2005 |

OTHER PUBLICATIONS

Chinese Decision on Rejection in Application 200880020159.2, mailed Jun. 18, 2012, 24 pgs.

Chinese First Office Action in Chinese Application 200880020159.2, mailed Jul. 28, 2011, 23 pgs.

European Extended Search Report in Application 08769941.9, mailed Mar. 28, 2012, 7 pgs.

European Notice of Allowance in Application 08769941.9, mailed Jan. 9, 2013, 7 pgs.

International Search Report for PCT Application No. PCT/US2008/065441, mailed May 30, 2008, 12 pgs.

Russian Notice of Allowance in Application 2009146029, mailed Nov. 30, 2012, 16 pgs.

Schulzrinne et al., "Internet Telephony: Architecture and Protocols an IETF Perspective", available at least as early as Feb. 1, 2007, at <<http://www.cs.columbia.edu/-hgs/papers/Schu9902_Internet.pdf>>, Jul. 2, 1998, pp. 1-21.

Schulzrinne et al., "RTP: A Transport Protocol for Real-Time Applications", available at least as early as Feb. 1, 2007, at <<ftp:llftp.rfc-editor.org/in-notes/rfc3550.pdf>>, The Internet Society, 2003, pp. 1-89.

Smith, et al., "Tandem-Free Operation for VoIP Conference Bridges", available at least as early as Feb. 1, 2007, at <<htlpJlwww.tsp.ece.mcgill.ca/Kabal/papers/2003/SmithC2003.pdf>>, IEEE, 2003, pp. 1-5.

U.S. Appl. No. 11/761,963, Amendment and Response filed Nov. 13, 2012, 14 pgs.

U.S. Appl. No. 11/761,963, Amendment and Response filed Dec. 6, 2011, 13 pgs.

U.S. Appl. No. 11/761,963, Amendment and Response filed May 30, 2012, 14 pgs.

U.S. Appl. No. 11/761,963, Amendment and Response filed Jun. 21, 2011, 13 pgs.

U.S. Appl. No. 11/761,963, Amendment and Response filed Sep. 10, 2010, 12 pgs.

U.S. Appl. No. 11/761,963, Notice of Allowance mailed Dec. 7, 2012, 9 pgs.

U.S. Appl. No. 11/761,963, Office Action mailed Jan. 30, 2012, 11 pgs.

U.S. Appl. No. 11/761,963, Office Action mailed Mar. 21, 2011, 11 pgs.

U.S. Appl. No. 11/761,963, Office Action mailed Jun. 10, 2010, 10 pgs.

U.S. Appl. No. 11/761,963, Office Action mailed Jul. 12, 2012, 11 pgs.

U.S. Appl. No. 11/761,963, Office Action mailed Sep. 6, 2011, 11 pgs.

Japanese Notice of Rejection in Application 2010-512258, mailed Jul. 19, 2013, 6 pgs.

Japanese Office Action in Application 2010-512258, mailed Feb. 4, 2014, 8 pgs.

* cited by examiner

ACTIVE SPEAKER IDENTIFICATION

CROSS-REFERENCE TO RELATED APPLICATIONS

This application is a continuation of and claims the benefit of U.S. Pat. No. 8,385,233, filed Jun. 12, 2007, which application is incorporated herein by reference.

BACKGROUND

Media conference participants may have difficulty identifying other conference participants. A participant may be unfamiliar with a speaker's voice or a participant's face or the audio exchange may confuse a listener. In the latter case, a listener, whether speaking or not, may be confused if several participants are speaking concurrently or if there is a rapid exchange between multiple participants. In some cases, speakers may include his/her name "[t]his is Bob, . . . " or a listener may ask the identity of a previous speaker. The complexity of this issue may increase as the number of participants speaking, or contributing audio input, increases. While a listener may derive the speaker's identity from "context clues" within the conversation, in some instances, participants may not comprehend which participants are providing audio input.

Additionally, minimizing bandwidth consumption, or the amount of data throughput for carrying information, may be desirable. For example, while a physical connection for transporting data may have additional throughput, consuming communication link resources may reduce the throughput available for other data transfers, or may impact conference audio data transfer if a user happens to have limited network bandwidth.

Acceptance of media conference improvements may be limited if the improvement is not "backwards compatible." For example, if a modification is inconsistent with existing protocols and versions, users may have to obtain an updated version to communicate with a participant implementing the modified version and/or seek organizations approval. The foregoing situation may inhibit acceptance of the modified technology.

SUMMARY

Procedures for identifying clients in an audio or audio/video event are described. In an example, a media server may order clients providing audio based on the input level. An identifier may be associated with the client for identifying the client providing input within the event. The ordered clients may be included in a list which may be inserted into a packet header carrying the audio content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques are described to identify active audio contributors in a media event. In implementations, a list of contributing or participating audio clients may be arranged based on the client contribution to the session. An identifier may be associated with the participating clients so that clients may identify which client(s) are actively contributing to the event. The arranged list may be inserted into data stream packet headers for forwarding to conference clients. In implementations, the identification information may be included in control packets used in conjunction with data transport. The techniques discussed herein may provide speaker information while consuming minimum network resources and without raising synchronization issues.

In further implementations, a media server for switching/mixing audio streams may be configured to insert an ordered list of active clients into data packet headers. For example, the media server may include a list of active speakers which may be ordered based on current active speaker, such that clients are provided with information regarding which clients are actively speaking. The list may be provided without increasing the media transport overhead for a network.

Exemplary Environment

Figure 1:
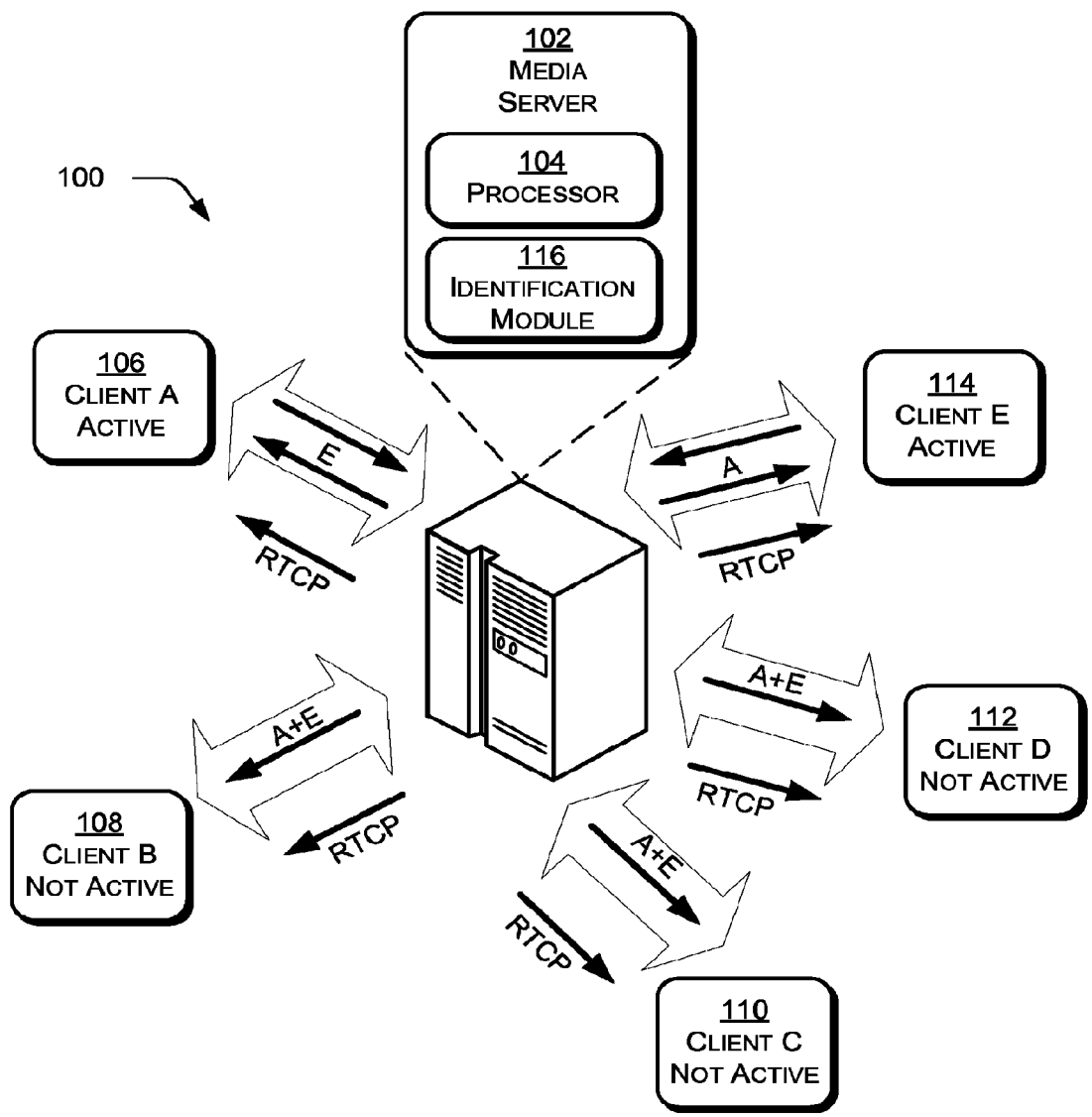
FIG. 1 illustrates an environment in an exemplary implementation that may use technologies to permit active speaker identification.

FIG. 1 illustrates environment 100 in exemplary implementations that are operable to use active speaker identification. For example, a media server 102 may identify active audio clients while mixing and switching between client provided audio streams in a media event. While audio data handing is discussed, the media server 102 may handle other type of media data including video and so on, based on the conference and the capabilities of the client devices. For example, the media server 102 may manipulate audio/video data for some clients, while forwarding, audio data to clients lacking video capability and so on.

For example, a media server processor 104 may determine which client or clients are actively contributing audio content while mixing/switching audio streams for clients. The media server processor 104 may determine which clients are actively inputting audio data based on the mixing/switching algorithm/techniques employed by the processor for generating send media streams. The determination may be used to order a list of clients contributing to outbound media streams from the media server 102, or which clients contributed to the media server output.

For an audio event including Clients "A" 106, "B" 108, "C" 110, "D" 112 and "E" 114 in which Clients "A" 106 and "E" 114 are contributing audio input (such as Clients A 106 and E 114 are carrying on a conversation), non-active Clients "B" 108, "C" 110, "D" 112 may be provided with the "A+E" send stream from the media server 102, or a combination of the two speakers, while Clients "A" 106 and "E" 114 respectively receive the opposite party send stream from the media server 102 (e.g., Client A 106 receives a Client E send stream while Client E 114 receives the Client A send stream). Suitable client devices include, but are not limited to, voice over internet protocol (VoIP) phones, computing device having audio capability, publicly switched network telephones (PSTN) phones connected through a gateway to the digital audio session, and so on.

In some implementations, active speakers may not be provided with a signal including the speaker's own send stream to avoid feedback or an echo (e.g., Client A 106 may not be sent an audio stream containing Client A audio). Several general identification scenarios may be considered, for example, Client A may be "talking over" Client E (such as if the participant associated with Client A 106 is speaking loudly while Participant "E" (associated with Client E 114) is speaking in a comparatively normal voice), Participants "A" and "E" are engaged in a quick exchange in which the current speaker changes between the two participants, or Participant "A" predominates the conversation while Participant "E" provides relatively less input. An example of the latter situation may include a participant who adds minor acknowledgements to the primary speaker's prevailing soliloquy.

In implementations, the media server 102 may determine the dominant client (and thus a speaker) based on the number of packets received from the client, when audio content is received, packet size, energy audio level and so on. Thus, while two or more clients are contributing content contemporaneously, one active client may be assigned as the dominant client (and thus a speaker) based on the foregoing factors. For example, the media server 102 may determine the current active client (and associated speaker) based on the current data packets, including the audio content received from the active client in conjunction with mixing and/or switching between the inputs received from different clients. For instance, the media server 102 may designate Client A 106 as the current "active" client, if Client E is not presently contributing data packets. In other instances, if both Client A 106 and Client E 114 are active, but Client A 106 is contributing audio content with a greater energy level than Client E 114 (i.e., participant A is speaking loudly while E is speaking in a lower tone), Client A 106 may be assigned as the dominant active speaker. Clients may be provided with an active client list which commences with Client A 106. This type of determination may be made when mixing/switching client input audio streams for one or more ongoing conferences. For example, the media server 102 processor may differentiate between the active clients when employing a mixing algorithm, while an identification module 116 may be used to insert the information in the applicable data packets.

Figure 2:
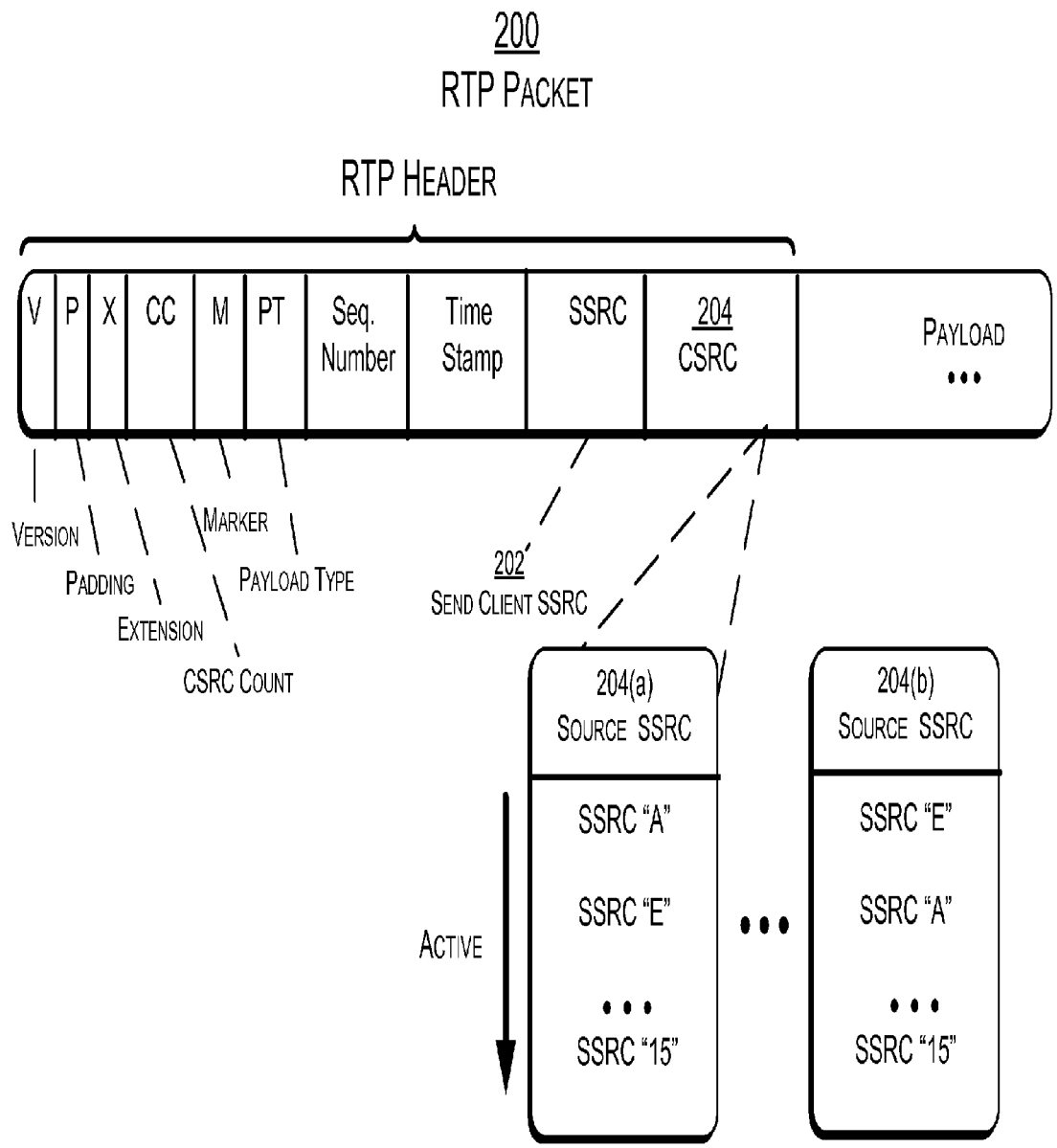
FIG. 2 is a diagram depicting a real-time protocol data packet including ordered/re-ordered active clients list in list of contributing sources (CSRC) field.

With general reference to FIG. 2, in implementations, when implementing real-time transport protocol (RTP) and associated real-time control protocol (RTCP), the media server 102 may identify active clients, and thus active speakers, by examining data within the streams sent from the clients, including data transport and signaling streams. In the case of Client A 106, the media server 102 may identify that the audio client send stream is originating from Client A 106 by examining the synchronization source (SSRC) field within the RTP packet or from the Client SSRC (an identifier for the client within the session) and the canonical name (CNAME) included in the RTCP report. Other information may be examined as well. The SSRC also may be obtained from the RTP packet header. For example, the SSRC may be mapped to the CNAME in a RTCP report.

While RTCP signaling may be used to identify missing packets, insure data transport quality and so on, a RTCP report may be obtained from the RTCP out-of-band signals. For example, the RTCP report may include the randomly generated client SSRC mapped to a client CNAME. A CNAME generally is an identifier/record which is associated with the aliases used for the client device. In some instances, the CNAME is a string of numbers or the like. In implementations, the media server 102 may be assigned a SSRC within the session. In some instances, the SSRC may change for a client included in a session. For example, a client SSRC may change if a client cuts-off (e.g., a long pause and then rejoins), if client SSRCs collide (more than one client is issued a common SSRC) and so on. In this manner, an incoming data stream may be identified from the SSRC in the data stream or from the RTCP signaling. The media server 102 may also obtain the canonical name from the RTCP signaling for use in identifying the client.

When generating a send stream (including audio output), the media server 102 may identify which clients are contributing audio input to the session from the SSRC and the CNAME obtained from the active client. For example, the media server 102 may associate the SSRC, the CNAME inserted into the RTCP packet, with the audio content send stream (i.e., the media server output stream(s) carrying the audio data). Returning to the previous example session between Clients "A" 106, "B" 108, "C" 110, "D" 112 and "E" 114, in the case of the mixed signal "A+E", the media server 102 may order Clients "A" and "E" according to which client is presently active, which one is active and dominating the session, or the like. The order may be varied based on the client providing the audio input. In this case, the list may start with an identifier for Client A 106 and include Client E 114, if Client A is currently providing input, or if Client A dominates the conversation. In situations in which there is an audio exchange between Client A 106 and Client E 114, the order may be changed based on the participant currently speaking, as indicated on a per packet basis.

Referring to FIG. 2, in a RTP configuration, the media server identification module 116 may insert the ordered list of SSRCs in the output stream RTP packet header. For example, the ordered identifiers are inserted in the list of contributing sources (CSRC) field 204 in the packet header sent in the data stream. If Client A and Client E are exchanging current active roles, the arrangement of SSRC may change from "Client A, Client E . . . " 204(*a*) to "Client E, Client A . . . " 204(*b*). In the previous fashion, the clients receiving the data stream (listening clients or participants in the session) may be apprised as to which clients are providing input, the relative contributions, and so on while avoiding additional signaling, associated synchronization issues and network overhead. For instance, the CSRC filed may be permitted to include up to fifteen identifiers of thirty-two bits apiece while remaining in conformance with the specification. Clients not performing in conformance with the techniques discussed herein may participate without the benefits discussed herein. Thus, making the system and techniques backwards compatible.

While the SSRC may identify the active client, using an SSRC may be problematic as a SSRC may be randomly assigned, may change due to a collision with another client having a similar SSRC, the client being reassigned an SSRC after dropping out of a session and then rejoining the session and so on.

The media server 102 may insert the active client CNAME(s) in the RTCP packets forwarded to the clients (e.g., so the other "listening" clients may be made aware of the active client CNAME and SSRC). For instance, the media server identification module 116 may "fan-out" the active client identifiers sent to the "listening clients" in the media server RTCP packets. For example, if several active clients are contributing to a conference, the media server may insert the obtained client identifiers at designated intervals in the RTCP packets sent in conjunction with the media server data stream. While RTCP packets may include the CNAME within each packet. The CNAME(s) may be interspersed in the RTCP packets forwarded to the listening clients to minimize transport overhead. The clients receiving the media server RTCP data, including the active client identifiers, may store the data in local memory so that the CNAME may be associated with the data packets as the audio content is received. For example, the CNAME, the mapped SSRC and other related information may be stored in a look-up table or the like. For example, while audio content included in the data stream may be sent in a generally continuous manner, RTCP signaling may occur only intermittently, such as, at specified intervals (e.g., at 5 or 10 second intervals). Thus, a client receiving a data packet may associate a SSRC in the CSRC with a previously received CNAME. In implementations, a globally routable user agent universal resource indicator (GRUU) may be used for identifying a particular client.

In implementations, an active client may be informed that the client is the one active in the conference. For example, the participant (associated with an active client) may desire to know that he/she is not "talking over" another participant. Returning to the session between Client "A" 106, "B" 108, "C" 110, "D" 112 and "E" 114, if for example, Client A 106 is active but Clients "B" 108, "C" 110, "D" 112 and "E" 114 are not active, this may be identified via the RTCP signal forwarded to Client A. Thus, while the media server 102 may generate a send media stream for Clients "B", "C", "D" and "E" by passing through the Client A send stream, Client A 106 may identify that no other client is active based on the CSRC/RTCP packets as a "listening" client or a member of the session.

In further implementations, human understandable information may be associated with the SSRC and CNAME. For example, a user may desire that a picture of the speaking participant be displayed on an associated monitor when that participant is speaking. In implementations, human comprehendible client information may be exchanged between clients. For example, the data may be exchanged generally at the beginning of an event or session.

While the Internet (the World Wide Web) may be used for connecting clients and other components, other networks and various links are suitable as well. For example, a network connecting the media server 102 to a client may include a wide area network (WAN), a local area network (LAN), a wireless network, a public telephone network, an intranet, and so on. The network may be configured to include multiple sub-networks.

The following discussion describes techniques that may be implemented using the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Exemplary Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. A variety of other examples are also contemplated.

Figure 3:
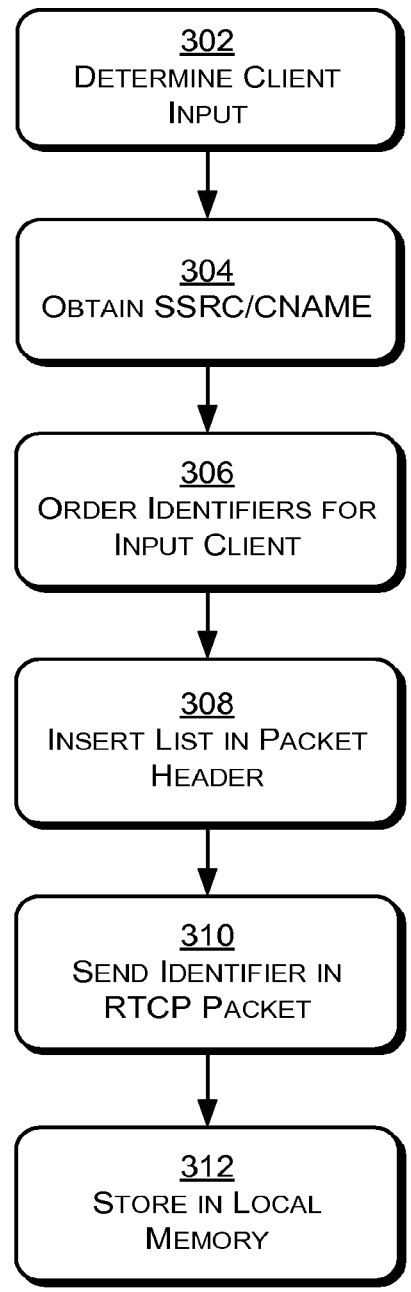
FIG. 3 is a flow diagram depicting a procedure in an exemplary implementation for identifying active clients.

FIG. 3 discusses exemplary procedures for identifying active audio input clients in media sessions. For example, the techniques may be used in a conference call or a media conference in which some clients lack video capability and so on.

In implementations, a media server, serving as a host, or central point, may determine 302 audio input clients with respect to the input provided by each active client. For example, a determination may be made as part of mixing and/or switching audio client input. Thus, Client A may be assigned as the paramount active client until a different client provides audio input. In another example, Client A may be selected if Client A and Client E are contributing but Client A's audio has a higher energy level. Client audio may have a higher energy level if the participant associated with the client is talking in a loud voice or is talking in a more continuous fashion such as if the client is dominating the audio input.

An audio input client may be identified as the "top" client if the client is currently active, dominates the conversation and so on. In RTP/RTCP systems functioning in accordance with the present techniques, the media server may obtain the client input streams and associated RTCP packets (e.g., the RTCP packets sent from a client) including a SSRC mapped to a CNAME 304 for the particular client generating the stream including the audio content. For example, the media server may obtain the SSRC and CNAME for the client. The CNAME identifying the client in conjunction with the SSRC. The media server may order 306 the input client SSRCs according to which clients are currently providing audio input, dominating the conversation, and so on. For example, the media server may order the active clients SSRC identifiers descending from the current active "speaker" e.g., the active client providing input. In instances, RTP may permit identification of 15 active speakers using a thirty-two bit identifier per active client included in the CRSC.

The media server may associate an identifier with the audio input client. For instance, the media server may obtain the SSRC and CNAME from an audio input client RTCP packet. The SSRC may be used to identify the audio input client in the CRSC field included in the media server output stream.

The clients may receive/associate other data with the audio input client. For example, a receiving client (a listening client or a client in the media event) may have human understandable information associated with the CNAME. For example, a client may have a picture of the participant, the participant's name and so on (which is associated with the client CNAME/SSRC).

The ordered audio input client identifiers may be inserted 308 into a list in the packet header. For example, if Clients "A" and "E" are providing audio input (with Client A being the current active client), the CSRC field in the RTP header may include the SSRCs with the SSRC for Client "A" commencing the list. In this way a listening client (which may include an audio input client which receives audio input from another active client) may be informed of the speaker's identity inside the content stream. In another example, the order of the audio input clients in the list may be based, at least in part, on which audio input client is dominating the media session. Dominating considerations may include energy level of the audio input, duration of the input, duration of silence periods, packet size, and so on. For example, the list may commence with Client A because Client A is currently active and the Client A send stream indicates a high energy level in comparison to one or more other audio input clients.

The media server may send 310 to a listening client (a session client) the SSRC and CNAME in the media server send stream(s) (such as in RTCP packets sent in conjunction with content transport). The SSRC, for the audio input clients, may also be located the CSRC field in the data stream packet header in RTP packets. For example, if in a five client media event, three participants are speaking, the client SSRC and CNAME associated with the audio input clients may be included in the media server RTCP packets (sent to the listening clients) associated with the RTP packets communicating the audio content. In this way, the media server may send the clients the SSRC and the CNAME identifying the active audio clients. Thus, a listening client may identify the originating source of the audio content with reference to the SSRC(s) and CNAME(s) in the RTP packet. A client SSRC may be updated if the client SSRC collides with the SSRC issued to another client, or if the client changes a source transport address for another reason. The SSRC(s) and CNAME(s) may be stored in local memory 312 so that a listening client may access the information throughout the media event.

Figure 4:
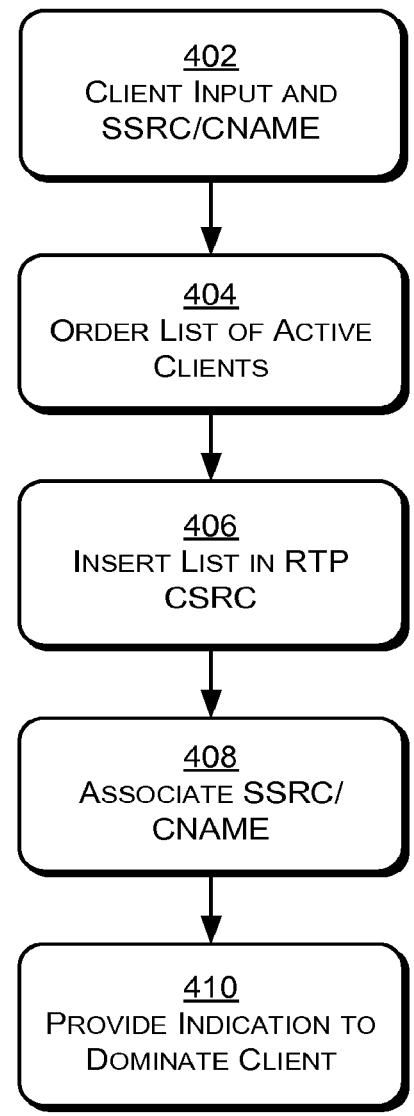
FIG. 4 is a flow diagram depicting a procedure in an exemplary implementation for identifying active clients in a real-time protocol conference.

FIG. 4 exemplary techniques for identifying active clients in a media conference are discussed. For instance, the present techniques may be used during a media conference in which some of the clients lack video, or may be used in an audio conference call.

In the present implementations, a media server may receive 402 active client input (audio content) as well as identifiers from the active clients. For example, a client contributing to an audio conference may send a SSRC and a CNAME which identify the client. For example, the SSRC may be included in the data stream in a RTP packet header and in a RTCP packet along with the CNAME.

An ordered 404 list of one or more active clients within a conference may be generated. For example, a media server mixing/switching audio input stream may arrange a list of active client (SSRC identifiers in RTP/RTCP), or those clients providing input into the conference or session. For example, the media server is an audio/video mixing server (AVMCU) which obtains the SSRC identification from an active client send stream which in-turn may include a data portion and an associated signaling portion. The AVMCU may then determine the relative arrangement of the active clients SSRCs or other identifier for the client within the session. The SSRC may be identified from an RTCP report which may map to the client CNAME. For example, the ranking may be based on which client is presently active. In other implementations, factors such as the energy level, the number of data packets provided, the duration of the silence periods, packet size and so on may be taken into account. For example, the ordered list may commence with an active client which may dominate the session because of the number of packets provided, while a second contemporaneously active client is assigned a lesser relative status.

The ordered list may be inserted 406 in to the CSRC list field included in packet headers within the media server send data stream flows. For example, the media server output includes the audio provided by an active client, a CSRC field with the ordered list of SSRC identifiers for the active clients. As a result, a listening client, i.e., a client receiving the audio content stream, may be informed as to which clients are active, and the relative relationship of the active clients. Additionally, the SSRC and the CNAME may be included in media server send RTCP packets.

The SSRCs may be associated 408 with the CNAME of the active audio client. For example, a media server may send a RTCP packet which includes the client CNAME related to an SSRC included in the CRSC field in the RTP packet header. The CNAME may be obtained from the RTCP packets.

Human understandable information may be associated with the CNAME and/or the audio input client SSRC as well. For example, a picture or a name may be associated with the client CNAME so that a participant's picture or name appears when the associated client is providing audio content. This information may be communicated within the conference or a client may input this human understandable information.

In further implementations a GRUU may be associated with the SSRC for the active client. In some situations in which a client is active, but other clients are not active, the media server may provide 410 an indication to the active client so that the active client is notified that no other client is active, although the active client send stream is not returned to the active client. In this manner, the active client is made aware that the participant is not "talking over" another participant.

While RTP and RTCP are discussed the techniques and implementations of the present disclosure may be applied to other protocols data transport mechanisms.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:
1. A method comprising:
associating a first identifier with a first audio input client, a second identifier with a second audio input client, and a third identifier with a third audio input client, wherein the first, second, and third audio input clients are active participants in a conference;
determining that the first individual input client is a dominant speaker over the second individual audio input client and the third individual audio input client; and
ordering the first identifier above the second identifier and the third identifier in a list based on the determination that the first individual audio input client is the dominant speaker over the second and third individual audio input clients, wherein the first identifier is placed at the top of the list to identify a relative relationship of the first, second, and third audio input clients; and
inserting the list into a packet header.
2. The method of claim 1, wherein the conference uses the real-time transport protocol (RTP).
3. The method of claim 2, wherein the list is a contributing source list (CSRC).
4. The method of claim 1, wherein the determination is based on the number of packets received from the first audio input client.
5. The method of claim 1, wherein the determination is based on when audio content is received from the first, second, and third audio input clients.
6. The method of claim 1, wherein the determination is based on packet size.
7. The method of claim 1, wherein the determination is based upon energy audio level of the first, second, and third audio input clients.
8. The method of claim 1, further comprising associating a fourth identifier with a fourth audio input client, wherein the fourth audio input client is not an active participant in the conference.
9. The method of claim 8, wherein the list does not include the fourth identifier.

10. A media server comprising computer executable instructions that, when executed by a processor, perform a method comprising:
- associating a first identifier with a first audio input client, a second identifier with a second audio input client, and a third identifier with a third audio input client;
- determining that the first individual input client is a dominant speaker over the second individual audio input client and the third individual audio input client; and
- ordering the first identifier above the second identifier and the third identifier in a list based on the determination that the first individual audio input client is the dominant speaker over the second and third individual audio input clients, wherein the first identifier is placed at the top of the list to identify a relative relationship of the first, second, and third audio input clients; and
- inserting the list into a packet header.

11. The media server of claim 10, wherein the method further comprises associating a fourth audio input client with a fourth identifier.

12. The media server of claim 11, wherein the method further comprises determining whether the fourth client is an active participant.

13. The media server of claim 12, wherein when the fourth client is not an active participant, the fourth identifier is not included in the list.

14. The media server of claim 10, wherein the determination is based on at least one of:
- number of packets received from the first, second, and third audio clients;
- packet size;
- when audio content is received from the first, second, and third audio clients; and
- energy audio level of the first, second, and third audio input clients.

15. The media server of claim 10, wherein the conference uses the real-time transport protocol (RTP).

16. The media server of claim 10, wherein the list is a contributing source list (CSRC).

17. A system comprising:
at least one processor; and
memory in communication with the at least one processor, wherein the memory comprises computer executable instructions that, when executed by the at least one processor, perform a method comprising:
- receiving a first input from a first individual audio input client;
- receiving a second input from a second individual audio input client;
- receiving a third input from a third individual audio input client, wherein the first, second, and third audio input clients are active participants in a conference;
- associating a first identifier with the first individual audio input client, a second identifier with the second individual audio input client, and a third identifier with the third individual audio input client;
- upon receiving the first, second, and third input, determining that the first individual audio input client is a dominant speaker over the second individual audio input client;
- ordering the first identifier above the second identifier and the third identifier in list based on the determination that the first individual audio input client is the dominant speaker over the second and third individual audio input client active participants, wherein the first identifier is placed at the top of the list to identify a relative relationship of the first, second, and third audio clients, and wherein inactive participants are not included in the list; and
- inserting the list into a packet header.

18. The system of claim 17, wherein the list is a real-time transport protocol (RTP) contributing source list (CSRC).

19. The system of claim 17, wherein the method further comprises sending a canonical name (CNAME) and a synchronization source (SSRC) identification mapped to the CNAME for the first, second, and third audio clients.

20. The system of claim 19, wherein the CNAME and associated SSRC are obtained from a real-time control protocol (RTCP) record for the individual client.

* * * * *